United States Patent
Butruille et al.

[11] 3,805,960
[45] Apr. 23, 1974

[54] FRAME FOR A SEMI-PERMEABLE MEMBRANE ASSEMBLY

[75] Inventors: Yves Butruille; Jany Mourlan, both of Lyon, France

[73] Assignee: Rhone-Poulenc S.A., Paris, France

[22] Filed: June 30, 1972

[21] Appl. No.: 268,164

[30] Foreign Application Priority Data
July 1, 1971  France .............................. 71.24099

[52] U.S. Cl. .............................................. 210/321
[51] Int. Cl. ........................................... B01d 31/00
[58] Field of Search ............. 210/321, 23; 204/301; 264/249

[56] References Cited
UNITED STATES PATENTS

| | | | |
|---|---|---|---|
| 3,014,855 | 12/1961 | Kressman | 204/301 X |
| 3,419,297 | 12/1968 | Diepenhorst et al. | 264/249 X |
| 3,501,010 | 3/1970 | Critchell et al. | 210/321 |
| 2,788,319 | 4/1957 | Pearson | 210/23 X |
| 3,541,595 | 11/1970 | Edwards | 210/321 |
| 3,318,795 | 5/1967 | Mintz et al. | 210/301 |

*Primary Examiner*—Frank A. Spear, Jr.
*Attorney, Agent, or Firm*—Cushman, Darby & Cushman

[57] ABSTRACT

Frames for clamping together the plane membranes and interposed plates of a semi-permeable membrane stack. The frame comprises two frame plates interconnected by tie-bars extending from one of the plates to pass through orifices in the other plate, the orifices being countersunk such that the tie-bars may be deformed in the orifices to limit subsequent increases in the distance between the two frame plates, so that the semi-permeable membrane stack is held tightly together.

12 Claims, 1 Drawing Figure

PATENTED APR 23 1974 3,805,960
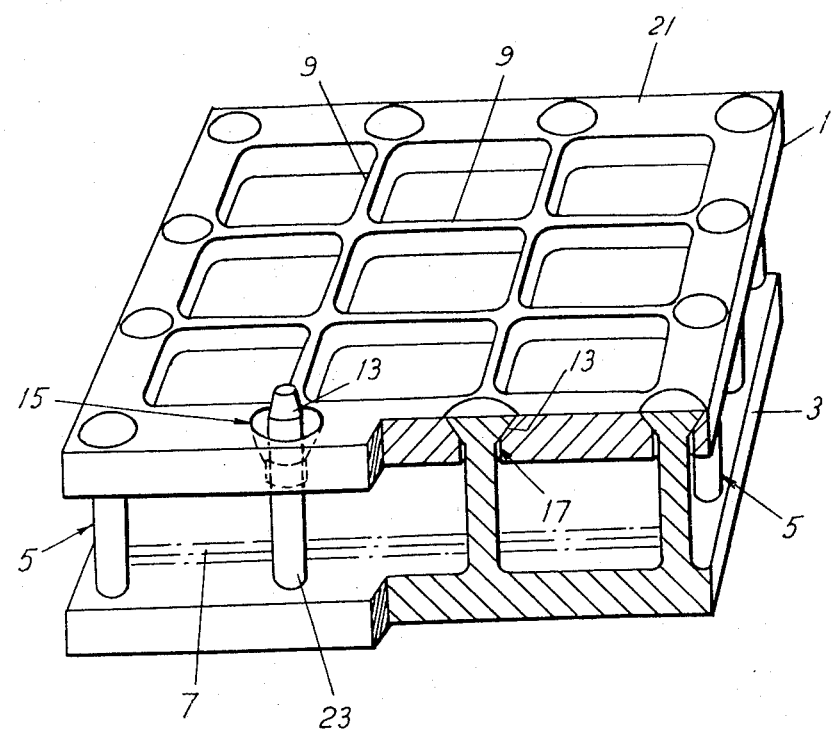

FRAME FOR A SEMI-PERMEABLE MEMBRANE ASSEMBLY

The present invention relates to a frame for clamping the plates and membranes of a semi-permeable membrane assembly, especially of the exchanger or separator type. This frame can be applied especially to assemblies which are used only on a limited number of occasions, or to assemblies which do not require to be dismantled. It is particularly suitable as a frame for an assembly which is to be employed once and then discarded, such as those used in medical engineering, with artifical kidneys or lungs.

Exchanger or separator assemblies possessing plane membranes generally consist of a stack of membranes and interposed plates clamped inside a frame. This frame usually consists of two plate members connected to one another by a system of clamps or, more frequently, bolts.

Previously proposed frames have been rather expensive to manufacture and, due to slippage in the clamping means in the course of time, have suffered from leaking and/or harmful deformation of the exchange zones, as well as excessive stresses which can cause the rupture of certain components of the assembly.

The subject of the present invention is a frame which avoids the disadvantages of the devices of the prior art and which is reliable and simple and economical to manufacture.

According to one aspect of the present invention we provide a frame for clamping plates and membranes of a semi-permeable membrane assembly and including two rigid frame plates a first of said frame plates having secured thereto at least one tie-bar, each tie-bar having associated therewith an orifice located in a second of said frame plates through which, from a first to a second face thereof the tie-bar may at least partially pass, and the side walls of each orifice diverging along at least a portion of its length from the first to the second side.

According to a second aspect of the invention we provide a semi-permeable membrane assembly comprising a first rigid frame plate having secured thereto at least one tie-bar; a second frame plate having at least one orifice extending between a first and a second face thereof and through which an associated tie-bar of the first plate at least partially passes, the walls of the orifice diverging away from the first frame plate to form a portion of enlarged cross-sectional area; and a stack of plane membranes and interposed plates, located between the first and second frame plates, each tie-bar being deformed to form a head at that portion, thereof within the associated orifice, snugly to occupy the enlarged portion of said orifice and thereby to limit relative movement of the first and second frame plates.

According to a third aspect of the invention we provide a method of forming such an assembly, this method comprising arranging a stack of plane membranes and plates between said two rigid frame plates; interlocating the or each tie-bar of the first frame plate in an associated orifice of the second frame plate; compressing the two frame plates and interposed stack in a press; deforming that end of the tie-bar remote from the first frame plate to cause it to fit snugly into the enlarged portion of the orifice; and releasing the thus formed assembly from the press.

The present invention will be better understood by means of the following description, which is given merely by way of example, reference being made to the accompanying drawing in which the sole FIGURE shows a perspective view in partial cross-section of a semi-permeable membrane assembly utilizing one embodiment of frame according to the present invention.

With reference to the FIGURE, it is seen that the frame comprises two rigid frame plates 1 and 3 connected by 12 tie-bars 5 uniformly spaced about the periphery of the frame. These plates are located on either side of a stack, shown in dot-dash lines at 7, of plane membranes and interposed plates. The frame plate 1 includes ribs 9 which improve its rigidity, and similar ribs (not shown) are provided in frame 3.

The tie-bars 5, as they have been shown in this preferred construction are integral with the frame plate 3 and extend from the internal face of that plate. In a preferred construction the plate 3 and the tie-bars 5 are produced by injection moulding a thermoplastic material. Each of tie-bars 5 is initially formed as a solid cylinder 23 with a frusto-conical end portion 13. The plate 1 differs from the plate 3 in possessing 12 orifices which are uniformly arranged around the periphery, each orifice 15 being located to receive an associated tie-bar. The profile of each orifice 15 flares out towards the outside, from a cylindrical portion 17 to a frusto-conical portion 19, the base of the cone being in the plane of the external face 21 of the plate 1. After connecting the tie-bars 5 to the plate 1, according to the technique described later, the end of the tie-bar 5 is deformed inside the orifice 15 to fill this orifice and to rest against its flared walls, as shown in partial cross-section.

The plates and the tie-bars may or may not be made of the same material and may or may not be homogeneous. Thus, suitably they can be reinforced, for example, by a metal framework. They can comprise metal components (for example, of duraluminium or steel) or components made of thermoplastic materials, such as polyolefines, polyamides, acrylic resins, polystyrene, mixtures of these or copolymers which especially possess good mechanical characteristics, in particular with respect to flexural strength and to tensile strength. Preferably, thermoplastic materials are used to which reinforcing fillers, especially asbestos, carbon and preferably glass fibres, have been added.

The semi-permeable membrane assembly thus formed can be of the exchanger type, that is to say, it can contain compartments which allow two fluids — liquid or gaseous — to flow on either side of a membrane. It can also be of the separator type, that is to say, it can contain compartments which allow a fluid to flow and, separated from them by a membrane, other compartments which allow a constituent of this fluid to be collected and removed. The internal arrangements of the components of the stack can be of any known type. There can be any number of interposed plates and the nature of the materials of which they are formed can be very varied.

The compartments can be supplied either in series or in parallel or by any series-parallel combination. The channels for the supply to or removal from the assembly of the fluids can consist of collecting channels arranged perpendicularly to the stack and can pass through the plates of the assembly via suitable orifices (not shown). They can also, and preferably, be arranged laterally, parallel to the components of the stack. In the latter case, they are connected to an external pipeline via a collector. This collector is suitably located between the plates 1 and 3 and between two consecutive tie-bars 5, without a connection to the frame.

The assembling of the different components of the illustrated embodiment of membrane assembly is carried out in the following manner. A stack of plane membranes and interposed plates is arranged on the frame plate 3, between the tie-bars 5. This stack is covered by the plate 1, so that each of the tie-bars 5 passes at least partially through an associated orifice 15 of the frame plate 1.

The assembly thus formed is placed between the platens of a press (not shown) and a compressive force is exerted on the two frame plates of the assembly until the thickness of the assembly is between 0.95 and 1, and preferably between 0.99 and 1 of the thickness it is desired the assembly should have during operation. The precise degree of the strain imposed is a function of the pertinent elasticity coefficients of the materials forming the interposed plates and the tie-bars, and of the number of interposed plates, and of their design, as well as of the cross-sectional configuration of the tie-bars.

The initial length of the tie-bars 5 is chosen so that their ends project sufficiently beyond the outer level of the plate 1 to enable them to be riveted to the plate 1. This may be achieved, in the case where the rods are of thermoplastic material, by softening the material and deforming the end into the flared part of the orifice 15. For example, the softening can be achieved by external heating and the deformation by the use of a suitable tool. Ultrasonic welding can alternatively be carried out. The end of the tie-bars 5 then assume the flared shape of the orifices of the plate, fill the orifices, and can suitably spill over the edges of the orifices onto the face 21 of frame plate 1. In this way, the riveting of all the tie-bars can be carried out successively or simultaneously. After cooling the deformed ends of the tie-bars, the platens of the press are opened and the assembly is removed from it.

As soon as the compression exerted by the press is relaxed, the tie-bars are subjected to a tensile stress, and as they then stretch very slightly the thickness of the assembly becomes substantially equal to the desired operational thickness. As a result, the internal compartment thus assumes those predetermined dimensions which are the result of rigorous study and which are necessary to achieve good exchanges or transfers across the membranes. It has been found that with the above described embodiment of frame and method of assembly these characteristics are retained over a very long period.

Generally, the compressive clamping force exerted by the press on the components of the assembly is maintained for a predetermined duration before riveting in order to absorb the initial creep of the stack of membranes and interposed plates. This delay is advantageously used to check the leak-tightness of the membranes, as well as of the various circuits of the module. It is then easy, where necessary, either to repair the assembly or if necessary, to adjust the clamping force to achieve a satisfactory leak-tightness.

The frame according to the present invention prevents any subsequent undesirable change in the clamping of the stack of plates and membranes, thereby ensuring that the clamping is sufficiently well controlled that leak-tightness of the module is achieved from the start and is maintained; and that the thickness of the compartments is and remains suitably calibrated and that the components of the assembly are subjected to only moderate stresses.

This result can be achieved by suitable adjustment of the compressive force exerted by the press, which can readily be experimentally determined. If the compression is insufficient, immediate leak-tightness is not achieved; while if the compression is excessive, besides the accidents stated above, the apparatus can leak by warping between adjacent tie-bars or by slackening following stretching of the tie-bars which have been subjected to an excessive force. This last cause of leakage is all the more dangerous because it only becomes apparent over a long period of operation.

The assembly can be assembled, tested, sealed and optionally sterilised and sealed for example, in sterile packing in the factory in order to be delivered ready for use. This method of production is simple and economic, and thus lends itself to mass production of assemblies which can be stored for long periods. Assemblies which are intended to be used only once can be constructed without any metal parts, and can thus easily be destroyed after use, in particular by burning.

The following example will illustrate more clearly the characteristics of an assembly utilising a frame constructed according to the invention.

EXAMPLE

An ultrafiltration assembly of the separator type is formed by a stack of 12 interposed plates injection-moulded of low density polyethylene, forming 11 mono-membrane assemblies with two compartments.

The lateral leak-tightness is achieved by squeezing. A peripheral rib of one interposed plate is squeezed against the adjacent plate to ensure leak-tightness. The interposed plates are of the following dimensions: 142 × 134 × 2.5 mm; and the frame plates and the tie-bars are made of styrene-acrylonitrile copolymer, having 35 percent by volume of glass fibres. They conform with the FIGURE and are produced by injection moulding. One of the frame plates carries 12 cylindrical tie-bars, each 6 mm in diameter.

The stack of plates and membranes, desired operational thickness 30 mm, is placed between the two frame plates. The assembly is placed under a press and a compressive force of 600 kg is exerted. The thickness of the module becomes 0.1 mm less than its desired operational thickness. It remains under this pressure for 1 minute 10 seconds of pressure, during which time the leak-tightness of the membranes and of the internal circuits is checked, before the free end of each of the 12 tie-bars is heated in hot air for 20 seconds and squeezed in order to rivet it in its associated orifice in frame plate 1; and then the press is opened. The tie-bars, in relaxing stretch by 0.1 mm such that the thickness between the plates of the container device now corresponds exactly to the desired operational thickness of the assembly. After 2 months' storage, it has been found that the thickness of the assembly has not altered substantially and its leak-tightness remains satisfactory.

The frame according to the invention can advantageously be used in the various types of assemblies possessing plane membranes. It is particularly suitable for assemblies which are discarded after they have been used once, and which can be used, for example, in the field of medical engineering, as haemodialysers, artificial lungs and artificial kidneys for ultrafiltration. More generally, it is very suitable for dialysers, modules for osmosis or inverse osmosis, ultrafiltration, hyperfiltration, gas permeation, pervaporation, heat exchanges and similar assemblies.

The frame according to the invention can also be produced in various other embodiments. For example, the two frame plates can be hinged together and held shut over a stack of plates and membranes by a single tie-bar. Naturally, the number of tie-bars and their arrangement are altered to suit the shape and the dimensions of the stack of plates and membranes. The tie-bars can be riveted to both frame plates. It is also possible for them not to be part of the first plate, but to be held against the latter by an enlarged head which may or may not be recessed. In this case, the two plates can be identical and, especially, can be equipped with identical orifices.

We claim:

1. A semi-permeable membrane assembly comprising in combination as a united structure:
   a. a first rigid frame plate of thermoplastic material;
   b. a first face of said first frame plate;
   c. at least one tie-bar of thermoplastic material rigidly secured to the said frame plate and extending from said first face substantially perpendicular thereto;
   d. a second rigid frame plate of thermoplastic material;
   e. first and second opposed faces of said second rigid frame plate;
   f. a stack of plane membranes and interposed plates disposed between the first face of the first frame plate and the first face of the second frame plate;
   g. means defining at least one orifice extending between the first and second faces of the second frame plate and through which an associated tie-bar of said first frame plate passes;
   h. walls of the orifice diverging from the first to the second face along a portion of the length of the orifice; and
   i. a head formed on the associated tie-bar by deformation to fit snugly into engagement with said walls to limit separation of said frame plates, the elongation of the tie-bars after uniting of the assembly being between 0 and 5 percent.

2. An assembly as claimed in claim 1, wherein at least one tie-bar is integral with the first frame plate.

3. An assembly as claimed in claim 1, wherein a plurality of tie-bars are uniformly arranged around the periphery of the frame plates.

4. An assembly as claimed in claim 1, wherein the thermoplastic material is re-inforced with asbestos or carbon.

5. An assembly as claimed in claim 1, wherein the thermoplastic material is re-inforced with glass fibre.

6. An assembly as claimed in claim 1, wherein the diverging portion of the walls defines a countersinking in the said second face of the second frame plate.

7. A method of clamping a semi-permeable membrane assembly comprising the steps of:
   a. providing a first rigid frame plate of thermoplastic material with at least one tie-bar extending substantially perpendicular to one face thereof and being rigidly attached to the first frame plate;
   b. providing a second rigid frame plate of thermoplastic material having first and second opposed faces with means defining at least one orifice extending between said first and second faces and through which an associated tie-bar of said first frame plate may at least partially pass, the orifice having walls which diverge from the first to the second face along a portion of the length of the orifice;
   c. providing a stack of plane membranes and interposed plates;
   d. locating the said stack between the said one face of the first frame plate and the first face of the second frame plate;
   e. locating the tie-bar within its associated orifice;
   f. compressing the stack between the first and second frame plates; and
   g. deforming that end of each tie-bar remote from the first frame plate, to cause the deformed tie-bar to fit snugly into the diverging portion of its associated orifice thereby to limit relative movement of the first and second frame plates, the clamping force exerted during the compression compressing the assembly to between 0.95 and 1.0 times a predetermined operational thickness.

8. A method as claimed in claim 7, wherein after initial compression of the assembly, the membranes and plates are allowed a period to assume an equilibrium position before carrying out deformation of the ends of the tie-bars.

9. A method as claimed in claim 8, and including the step of checking the leak-tightness of the assembly during the period between initial compression and deformation of the ends of the tie-bars.

10. A method as claimed in claim 7, wherein compression is to between 0.99 and 1.0 times the required operational thickness.

11. A method as claimed in claim 7, and including the step of applying heat to the ends of the tie-bars remote from the first frame plate thereby to soften the ends and facilitate deformation thereof.

12. A method as claimed in claim 7, wherein the deformation of the ends of the tie-bars is accomplished by ultrasonic heating.

* * * * *